Nov. 25, 1958
A. ELCE ET AL
2,861,923
PURIFICATION OF ALIPHATIC ACIDS
Filed June 16, 1954
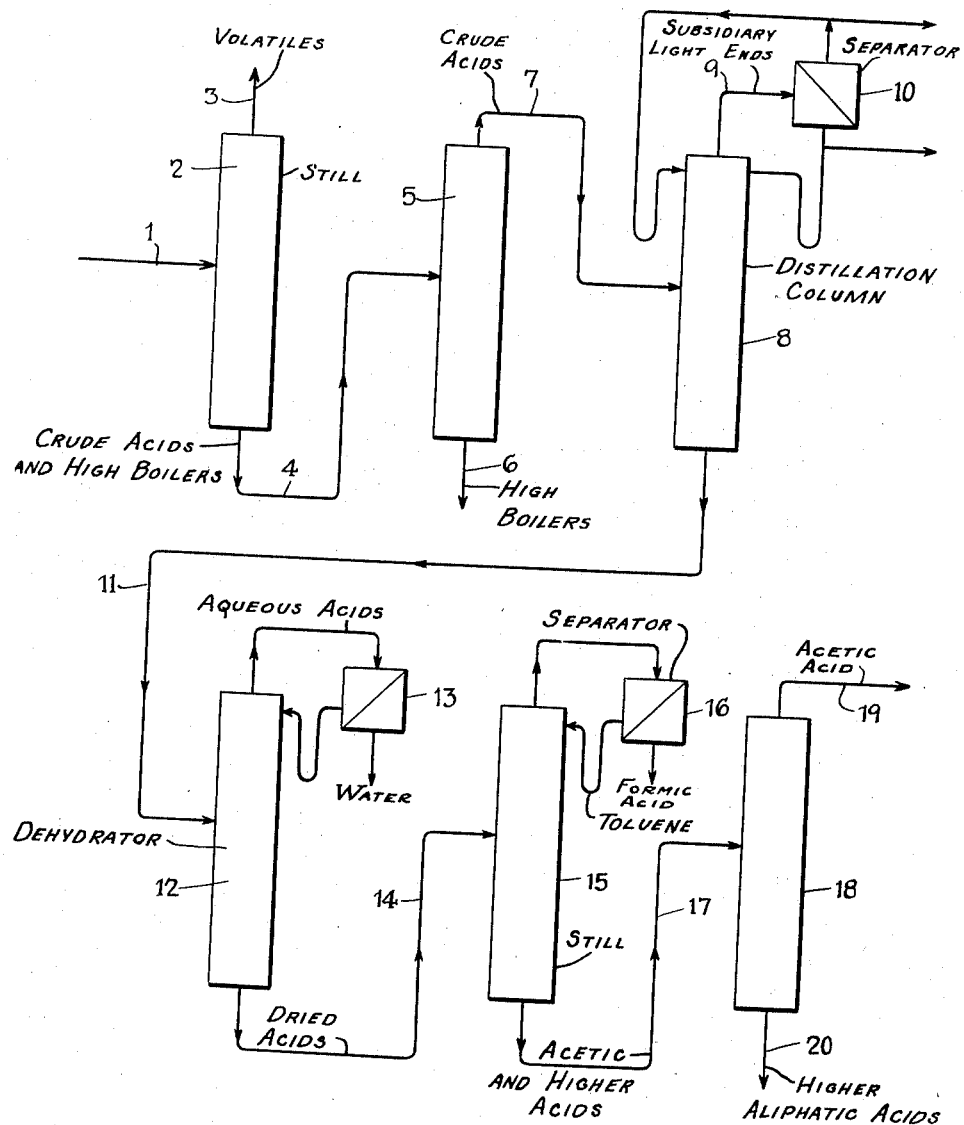
ALEC ELCE,
ARCHIBALD ROBERT GRAHAM,
ALFRED FRANK MILLIDGE,
IAN KENNETH MILES ROBSON,
DONALD PETER YOUNG,
INVENTORS
BY Ward Neal Haselton Orme & McElhannon
ATTORNEYS.

United States Patent Office 2,861,923
Patented Nov. 25, 1958

2,861,923
PURIFICATION OF ALIPHATIC ACIDS

Alec Eice, Epsom, Archibald Robert Graham, Richmond, Alfred Frank Millidge, Coulsdon, Ian Kenneth Miles Robson, London, and Donald Peter Young, Sanderstead, England, assignors to The Distillers Company Limited, Edinburgh, Scotland, a British company Application June 16, 1954, Serial No. 437,174

Claims priority, application Great Britain June 25, 1953

3 Claims. (Cl. 202—39)

The present invention relates to a process for the production of pure formic and acetic acids.

It is an object of the present invention to facilitate the separation by distillation of acetic and formic acids from the oxidation products of hydrocarbons, for example the lower paraffins. It is a further object to separate these acids, either together or separately, in a high degree of purity.

The oxidation products to which the process of our invention may be applied are obtained, for example, in the liquid phase oxidation of lower paraffins as described in Patents 2,800,504, 2,800,505, and 2,800,506, granted July 23, 1957.

The components of the liquid oxidation product obtained may be classified as (a) volatile non-acidic oxidation products of boiling point up to 99° C. in the presence of water, hereinafter referred to as "light ends," (b) water, (c) aliphatic monocarboxylic acids of 1 to 4 carbon atoms and (d) higher boiling residues, including higher acids. The relative proportions of these components (a)–(d) may vary widely, depending on the oxidation feedstock and conditions, without affecting the process of the invention.

When such a liquid oxidation product is subjected to a normal fractional distillation, then after the light ends and water preferably with the aid of an entrainer have distilled over, the monocarboxylic acids of 1–4 carbon atoms can be distilled over as successive fractions. As formic and acetic acids are difficult to separate from each other by distillation, they are usually recovered as a single mixed fraction which is subjected to a further operation to separate the two components. No matter how carefully the separation of the "light ends" is carried out during this fractional distillation of the oxidation product, the formic acid and acetic acid fractions are, or the formic-acetic acid fraction is, found to be contaminated by impurities which may impart a colour and foreign odour and which also may be detected by analytical methods, for example those used to detect the presence of carbonyl and ester groups.

It has been found that if the mixture of water and acids of 1 to 4 carbon atoms is separated from the residues, prior to dehydration and fractionation to separate the individual acids, there is a considerable improvement in the purity of the formic acid-acetic acid fraction obtained.

The invention accordingly comprises the novel processes and steps of processes, specific embodiments of which are described hereinafter by way of example and in accordance with which we now prefer to practice the invention.

Accordingly the present invention is for a process for the recovery of formic and acetic acids from the product of the liquid phase oxidation of aliphatic hydrocarbons containing (a) light ends, as hereinbefore defined, (b) water, (c) aliphatic monocarboxylic acids of 1 to 4 carbon atoms and (d) higher boiling residues, which comprises distilling the product to separate as distillate a mixture containing water and the aliphatic monocarboxylic acids of 1 to 4 carbon atoms and thereafter fractionally distilling this mixture to recover the formic and acetic acids.

During this distillation of the oxidation product small amounts of volatile, coloured, non-acidic materials, for example ketones and esters are produced, probably as a result of the decomposition or oxidation of components of the residues. These non-acidic substances co-distil with the mixture of water and mono-carboxylic acids of one to four carbon atoms, and are hereinafter referred to as "subsidiary light ends." Hence, although the separated formic and acetic acids fraction so obtained is of improved purity compared with that obtained by the known method of a straight fractional distillation, there may still be found amounts of volatile impurities in the formic acid-acetic acid fractions obtained. While the presence of these impurities may be tolerated in some applications of the acids, for many applications these impurities cannot be tolerated since they may impart an undesirable colour or they may show a tendency to oxidise and thus to contaminate the acids or the products into which the acids may be converted. More particularly in the case of acetic acid fractions there may be produced an unacceptable residual odour after neutralisation or the acid may otherwise fail to conform to the stringent industrial specifications.

It has further been found that these remaining undesirable impurities may be eliminated or reduced to negligible proportions by subjecting the mixture of water and acids to a further distillation operation, following its separation from the light ends and residues, in which the mixture is fractionally distilled to remove as distillate the subsidiary light ends. Upon subsequent separation of the formic and acetic acids from the base product of this last distillation, for instance by removal of water followed by fractional distillation, we have found that a formic acid-acetic acid fraction may be obtained which is virtually colourless and free from ester or carbonyl impurities and further that there may be isolated from this fraction, or from the mixed acids after removal of water, a pure acetic acid which satisfies the most stringent industrial requirements and has little or no residual odour after neutralisation.

Accordingly, a preferred embodiment of the present invention comprises the steps in the separation of pure fractions of formic acid and acetic acid from the oxidation products of lower paraffins, of distilling the oxidation product, desirably from which all or part of the light ends have already been removed, so as to separate a mixture of water and aliphatic monocarboxylic acids of not more than 4 carbon atoms from the higher boiling residues, and then subjecting this mixture to fractional distillation to remove as distillate subsidiary light ends prior to separating the formic acid-acetic acid fraction.

The separation of the mixture of water and the aliphatic acids of 1 to 4 carbon atoms from the light ends and residues may, for example, be carried out by flash distillation without fractionating, or preferably with the provision of a certain degree of fractionation by means of a fractionating column and reflux. The separation may be carried out either under reduced pressure or at atmospheric pressure. The residues from this distillation may be oxidised or recycled to the oxidation stages as for example is described in U. S. Application Serial No. 422,932. It has generally been found desirable in this distillation to restrict the temperature of the still base to about 160° C. In this case it may be advisable to operate under vacuum to obtain maximum stripping of acids.

The preliminary distillation of the oxidation product may be carried out so as to remove only part of the volatile products as the light ends fraction, the remainder being removed together with subsidiary light ends.

If so desired, the distillate comprising the subsidiary light ends may be allowed to separate into two liquid phases, which may be separated so that all or part of the upper liquid phase is removed, any remainder of this upper liquid phase being returned to the still as reflux; and all or part of the lower liquid phase is returned to the still as reflux, any remainder being removed. Of the two distillate liquid phases, the upper phase contains the bulk of the impurities whose removal from the acids is the object of our invention; these however may with advantage be recycled to the oxidation stage. The lower liquid phase of the distillate is mainly water, and part or all of this may desirably be removed from the system since in this way a certain degree of dehydration may be achieved. It is important, however, that there should at all times be a sufficient concentration of water in the base of the still at this stage to ensure complete removal of the impurities, and any dehydration effected should not be carried out so as to reduce the concentration of water in the base product to below about 8–10% by weight.

The following examples are given to illustrate the process of the present invention:

*Example 1*

An oxidation product, obtained by the liquid phase oxidation at 160° C. and at a pressure of 300 pounds per square inch gauge of a paraffinic hydrocarbon fraction of boiling range 15°–95° C. prepared by the straight distillation of a Middle-East petroleum was fractionally distilled to remove the light ends completely. The base product from this distillation was freed from the higher boiling compounds by distillation through a fractionating column packed with glass helices and equivalent to about 8 theoretical plates, at a reflux ratio of 1:1. The crude mixture of water and the acids thus obtained was subjected to a further fractional distillation through a packed column up to a head temperature of 99° C. at atmospheric pressure which produced a further 1.0% by weight approximately of subsidiary light ends, substantially neutral material of a bright yellow colour, which distilled over as a heteroazeotrope with water containing a small amount of acid. After removal of these impurities the remainder was fractionated through a column packed with glass helices, first in the presence of isopropyl ether to remove water and then to separate a formic acid-acetic acid fraction. The formic acid-acetic acid fraction thus obtained was almost colourless and contained by analysis the following amounts of impurities:

|  | Milliequivalent per 100 grams |
|---|---|
| Ester | 0.2 |
| Carbonyl compounds | 0.2 |

*Example 2*

An oxidation product prepared by oxidising the same feedstock as was used in Example 1 at 170° C. and a pressure of 600 pounds per square inch gauge, was fractionally distilled to remove the light ends as completely as possible. The base product from this distillation was freed from the higher boiling components by distillation through a fractionating column packed with glass helices and equivalent to about 18 theoretical plates, at a reflux ratio of 1:1. The crude mixture of water and acids thus obtained was subjected to a further fractional distillation through a packed column to a head temperature of 99° C. at atmospheric pressure which produced a further 1.5% by weight of substantially neutral materials of a yellow colour distilling over as a heteroazeotrope with water containing a small amount of acid. After removal of these impurities, the remainder was fractionated up a column packed with glass helices, first in the presence of isopropyl ether to remove water and then to separate a formic acid-acetic acid fraction. The pure formic acid-acetic acid fraction thus recovered was colourless and contained no detectable ester or carbonyl impurity.

*Example 3*

An oxidation product prepared by oxidising the same feedstock as was used in Example 1 at 170° C. and a pressure of 600 pounds per square inch gauge, was fractionally distilled in a continuous still at atmospheric pressure to remove the more volatile light ends, the head temperature being 60–65° C. The still base product was distilled at atmospheric pressure from higher boiling material in a continuous still of about 30 theoretical plates with fractionation, the head temperature being about 100–110° C. The crude mixture of water and acid thus obtained was fed to the mid-point of a continuous distillation column of 30 theoretical plates, under a reflux ratio of 7:1, the column head temperature being about 95° C. and the total distillate about 12% of the feed. The still base product from this distillation column was dehydrated using isopropyl ether as the entrainer in a continuous still, and the dehydrated acids thus obtained were fractionally distilled in a batch still to recover the formic-acetic acid fraction. The formic acid-acetic acid fraction was colourless and contained no detectable ester or carbonyl impurity.

*Example 4*

The apparatus employed in the process of this example is shown diagrammatically in the accompanying drawing. An oxidation product, obtained by the liquid phase oxidation at 170° C. and at a pressure of 600 pounds per square inch gauge, of a paraffinic hydrocarbon fraction of boiling range 15 to 95° C. was introduced by line 1 into a continuous still 2 operated at a head temperature of about 60°–65° C. From the head of the still the volatile light ends were removed by line 3, and from the base of the still, the base product comprising the acids were removed by line 4 and applied to a continuous still 5 of 5 to 7 theoretical plates wherein the base product was fractionally distilled to separate the crude mixture of acids from the higher boiling material, the column being operated at a head temperature of about 100–110° C. The higher boiling residues were taken off by line 6, and the distillate comprising the aqueous aliphatic acids were taken off by line 7 and fed to a continuous distillation column 8 of approximately 15 theoretical plates, the reflux ratio being about 9:1 and the head temperature 90 to 95° C., the total distillate being about 10% of the feed. The distillate comprising subsidiary light ends, was passed to line 9 to a phase separator 10, where the distillate separated into two phases, all or part of a lower liquid phase and/or all or part of the upper liquid phase being returned to the still as reflux, the remainders being removed. The base product, comprising the aqueous acids, was removed by line 11 and passed to a continuous dehydrating still 12 using isopropyl ether as entrainer. The overheads from the column were taken to a phase separator 13, the separated isopropyl ether layer returned to the column and the water removed. The still base product, comprising the dried acids, was passed by line 14 to a continuous still 15 using toluene as entrainer. The overheads from the column were taken to a phase separator 16, the lower layer comprising formic acid being taken off and the upper layer comprising toluene being returned to the column. The still base product was passed by line 17 to a continuous fractionation still 18 to separate as the overheads by line 19 acetic acid, which was finally distilled to remove traces of toluene and formic acid. The still base product removed by line 20 comprised the higher aliphatic acids. The acetic acid thus obtained was completely colourless, contained no detectable amounts of esters or ketonic compounds and completely satisfied the requirements of British Standard specification, B. S. No. 576:1950.

By way of comparison a sample of the aqueous oxidate as used in Example 1 was fractionated in a fractionating column of about 15 theoretical plates packed with glass helices. The formic acid-acetic acid fraction of boiling point range 100°–127°/60 mm. mercury was brown in colour and contained the following amount of impurities:

| | Milliequivalent per 100 grams |
|---|---|
| Ester | 16 |
| Carbonyl compounds | 17 |

After neutralisation with alkali a strong residual odour of higher ketones and esters remained.

We claim:

1. A process for the recovery of acetic acid from the product of the liquid phase oxidation of aliphatic hydrocarbons containing (a) light ends, (b) water, (c) aliphatic mono-carboxylic acids of 1–4 carbon atoms and (d) higher boiling residues, which comprises distilling the product prior to dehydration to remove said light ends, distilling the base product of this fractionation to separate from the higher boiling residues a distillate mixture containing water and the aliphatic mono-carboxylic acids of 1–4 carbon atoms containing colored contaminant including ketonic and ester compounds designated as subsidiary light ends, distilling said mixture to remove as distillate said subsidiary light ends, and thereafter fractionally distilling the base product to recover the acetic acid substantially free from said subsidiary light ends.

2. A process in accordance with claim 1, in which in distilling the mixture to remove as distillate the subsidiary light ends, including carbonyl and ester compounds, the water in the base of the still is maintained as above 8 to 10%.

3. A process in accordance with claim 1, in which the light ends and subsidiary light ends are recycled to be oxidized with the aliphatic hydrocarbons.

References Cited in the file of this patent

UNITED STATES PATENTS

| | | |
|---|---|---|
| 1,896,100 | Ricard et al. | Feb. 7, 1933 |
| 2,204,616 | Othmer | June 18, 1940 |
| 2,384,374 | Harrison | Sept. 4, 1945 |
| 2,734,067 | Chapman et al. | Feb. 7, 1956 |

FOREIGN PATENTS

| | | |
|---|---|---|
| 370,771 | Great Britain | Apr. 14, 1932 |